United States Patent [19]

Millar, Jr.

[11] Patent Number: 4,812,093

[45] Date of Patent: Mar. 14, 1989

[54] STAKE POCKET TIE-DOWN ANCHOR

[76] Inventor: Henry E. Millar, Jr., 36717 Government Rd., Dorena, Oreg. 97434

[21] Appl. No.: 249,700

[22] Filed: Sep. 27, 1988

[51] Int. Cl.$^4$ ............................................. B61D 45/00
[52] U.S. Cl. ..................................... 410/110; 410/116; 296/43; 105/390
[58] Field of Search ............... 410/101, 106, 108, 110, 410/116; 296/43; 105/390

[56] References Cited

U.S. PATENT DOCUMENTS

| | | | |
|---|---|---|---|
| 3,259,353 | 7/1966 | Webb | 410/116 |
| 3,351,356 | 11/1967 | Clark et al. | 410/110 |
| 3,421,726 | 1/1969 | Getter | 410/110 |
| 3,950,010 | 4/1976 | Robertson | 410/110 |
| 4,191,108 | 3/1980 | Jones | 296/43 X |
| 4,316,688 | 2/1982 | Roskelley | 410/116 X |
| 4,607,991 | 8/1986 | Porter | 296/43 X |

Primary Examiner—Johnny D. Cherry
Assistant Examiner—Gary C. Hoge
Attorney, Agent, or Firm—John F. Ingman

[57] ABSTRACT

The present invention provides a stake pocket tie-down anchor for pickup trucks which includes an L-shaped member having a vertical leg, with a threaded hole formed therein, which extends into the stake pocket so that it lies adjacent to the inner side wall of the stake pocket on the inside of the bed; and a horizontal leg, which extends past the outer edge of the stake pocket and across the top of the side rail. A tie-down connection member, preferably a hook, is attached to the horizontal leg and extends upwardly. A clamping plate, which has a hole formed therein, combines with a threaded bolt that passes through the hole in the clamping plate, through a hole in the inner side wall of the stake pocket, and into the threaded hole of the vertical leg, so that, upon tightening this bolt, the vertical leg is drawn toward the inner side wall of the stake pocket, thereby rigidly securing the tie-down anchor within the stake pocket of the pickup bed by forcing the horizontal leg tightly against the top of the side rail of the pickup or clamping the inner side wall between the vertical leg and the clamping plate.

3 Claims, 1 Drawing Sheet

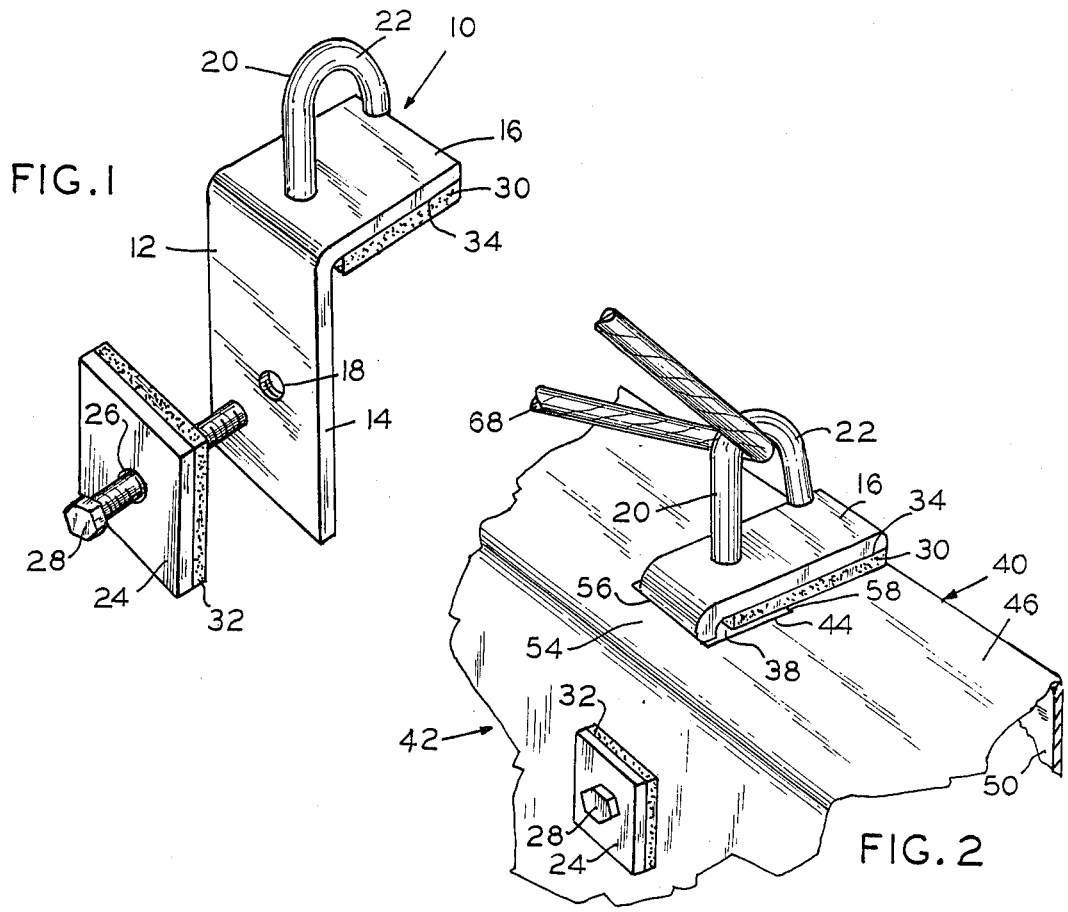
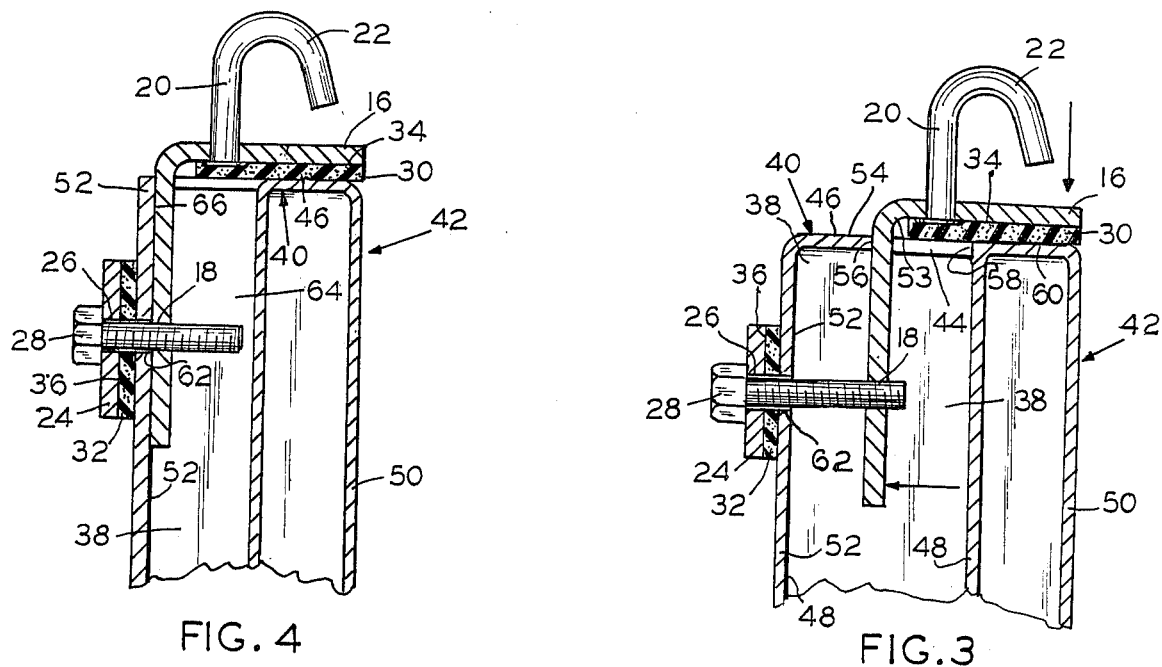

STAKE POCKET TIE-DOWN ANCHOR

BACKGROUND OF THE INVENTION

1. Field of the Invention

This invention involves a tie-down anchor, and, more particularly, involves a tie-down anchor for pickup trucks which utilizes the stake pockets in the side rails of the truck bed.

2. Description of the Prior Art

In general, pickup trucks are manufactured without built-in tie-down anchors to secure loads to the truck beds. Certain stake pocket anchors have been developed which consist of upper and lower compression plates, joined by an eyebolt, which enclose a rubber expansion block, so that, in drawing together the compression plates by tightening the eyebolt, the rubber block expands to press against the sides of the stake pocket Such devices, however, may pull out of the stake pocket, and generally are insufficient for securing heavy loads. Other tie-down anchors are available which may be permanently attached to the bed of the pickup by bolts or machine screws, but such tie-down anchors normally require undesirable multiple drilling on the exterior surface of the bed, and, if merely fastened by machine screws, have a tendency to rip out under a heavy load.

What is needed is an improved tie-down anchor for pickups which

- is strong, durable, and capable of restraining heavy loads;
- is readily installable and removable; and
- utilizes available pickup bed stake pockets with only a minimum of drilling.

SUMMARY OF THE INVENTION

The present invention provides a stake pocket tie-down anchor designed to satisfy the aforementioned needs. The invention involves a tie-down anchor for pickup trucks which utilizes the stake pockets in the side rails of the truck bed.

Accordingly, the invention includes an L-shaped member having a vertical leg, with a threaded hole formed therein, which extends into the stake pocket so that it lies adjacent to the inner side wall of the stake pocket on the inside of the bed; and a horizontal leg, which extends past the outer edge of the stake pocket and across the top of the side rail. A tie-down connection member, preferably a hook, which is attached to the horizontal leg, extends upwardly so as to be available for a tie-down line. A clamping plate, which has a hole formed therein, combines with a threaded bolt that passes through the hole in the clamping plate, through a hole in the inner side wall of the stake pocket, and into the threaded hole of the vertical leg, so that, upon tightening this bolt, the vertical leg is drawn toward the inner side wall of the stake pocket, thereby forcing the horizontal leg tightly against the top of the side rail of the pickup or clamping the inner side wall between the vertical leg and the clamping plate, thus rigidly securing the tie-down anchor within the stake pocket of the pickup bed.

BRIEF DESCRIPTION OF THE DRAWINGS

FIG. 1 illustrates a perspective view of the stake pocket tie-down anchor.

FIG. 2 shows the stake pocket tie-down anchor of FIG. 1 as installed in a pickup bed stake pocket.

FIG. 3 provides a cross sectional view of the installed stake pocket tie-down anchor of FIG. 2.

FIG. 4 provides a cross sectional view of an installed stake pocket tie-down anchor in an alternative stake pocket configuration.

DESCRIPTION OF THE PREFERRED EMBODIMENT

Referring now to the drawings, there is shown in FIG. 1 the preferred embodiment of the stake pocket tie-down anchor 10. A L-shaped member 12, made of a strong, durable material such as steel, has two legs: a vertical leg 14 having a threaded hole 18 formed therein, and the horizontal leg 16 having a tie-down connection member 20 attached thereto. The tie-down connection member 20 preferably is a steel hook 22 as illustrated, but may also be an eye or other form to which a tie-down line may pass through or be connected. A clamping plate 24, preferably in the form of a 2-inch square steel plate, has a hole 26 formed in the center thereof. A bolt 28 penetrates the hole 26 in the clamping plate 24, the inner pocket side wall 52 of the stake pocket 38 as described below, and engages the threaded hole 18 in the vertical leg 14 of the L-shaped member 12. Protective pads 30 and 32, such as made of foam rubber, may be adhesively attached, as illustrated, to the lower surface 34 of the horizontal leg 16 of the L-shaped member 12 and the inner surface 36 of the clamping plate 24, so as to protect the finish of the pickup bed 42.

Most full size, and some compact, pickup trucks have stake pockets 38 formed, two or more per side, in the side rails 40 of the pickup bed 42, with open space extending downwards to receive and retain stake-like means of anchoring various forms of vertical side extensions to the pickup bed 42. Such stake pockets 38 come in a variety of forms, but generally have the common elements of a square hole 44 formed in the top surface 46 of the pickup bed 42 side rail 40, and pocket side walls 48 on one or more sides of the stake pocket 38 which extend downwards to restrain movement of a stake (not shown) inserted therein. The pocket side walls 48 may be integral portions of the sides 50 of the bed 42 or may be specifically added to restrict stake movement. Of particular interest to this invention is the inner pocket side wall 52, that is, that pocket side wall 48 to the inside of the pickup bed 42.

FIG 2 illustrates a portion of the side 50 and side rail 40 of a pickup bed 42, wherein the stake pocket tie-down anchor 10 has been installed. In this common form of stake pocket 38, the stake pocket hole 44 is formed in the top 46 of the side rail 40 at a distance, usually less than ¾-inch, from the inner pocket side wall 52 of the pickup bed 42, so that a lip 54 forms the inner edge 56 of the stake pocket hole 44, as best seen in the cross sectional view of FIG. 3. In use, the stake pocket tie-down anchor 10 is inserted within the stake pocket 38 through the stake pocket hole 44 so as to position the vertical leg 14 parallel and adjacent to the inner pocket side wall 52, with the horizontal leg 16 crossing the outer edge 58 of the stake pocket hole 44 and laying against that portion of the top surface 46 of the side rail 40 which is to the outside of the stake pocket hole 44, shown as 60. Such outer top surface 60 adjacent to the stake pocket hole 44 normally is one to two inches in width, providing an extended bearing surface for the horizontal leg 16 of the tie-down anchor 10.

Referring to FIG. 3, a hole 62, of sufficient diameter to accommodate bolt 28, is formed in the inner pocket side wall 52. Some pickup truck beds 42 are manufactured with the hole 62 pre-formed in the inner pocket side wall 52, so that no additional drilling is required. For those pickups which do not have a pre-formed hole, hole 62 may be formed by the user, with a center located a distance below the top 46 of the side rail 40 corresponding to the distance between the center of the hole 18 in the vertical leg 14 and the lower surface 34 of the horizontal leg 16.

With the clamping plate 24 and protective pad 32, if used, against the inner pocket side wall 52, the threaded bolt 28 successively penetrates the hole 26 in the clamping plate 24 and the hole 62 formed in the inner pocket side wall 52, and engages the threaded hole 18 formed in the vertical leg 14 of the L-shaped member 12. As bolt 28 is tightened, the vertical leg 14 is drawn toward the inner pocket side wall 52, so that the upper portion 53 of the vertical leg 14 pivots about the lip 54 which forms the inner edge 56 of the stake pocket hole 44. This pivoting action forces the lower surface 34 of the horizontal leg 16, through the protective pad 30 if used, tightly against the outer top surface 60 adjacent to the stake pocket hole 44, thereby rigidly and securely seating the tie-down anchor 10 within the stake pocket 38.

FIG. 4 presents a cross-section of a common alternative stake pocket 64 configuration wherein the lip 54 is not present, but rather the stake pocket hole 44 is formed with its inner edge 66 immediately above the inner pocket side wall 52. In such stake pocket 64 configuration, when the threaded bolt 28 is tightened, the vertical leg 14 is drawn tightly against the inner pocket side wall 52 so that the wall 52 becomes tightly clamped between the vertical leg 14 and the clamping plate 24, thereby also rigidly and securely seating the tie-down anchor 10 at that position within the stake pocket 64.

While reference is made in both FIG. 2 and FIG. 3 to the inner pocket side wall 52, it is clear to those skilled in such matters that such inner pocket side wall 52 may not be continuous along the side 50 of the bed 42, but rather may take the form of a specially added inner pocket side wall 52 to support stakes, as described above. Furthermore, it may be possible that a pickup bed additionally has a separate inner bed side wall (not shown) as well as an inner pocket side wall 52 so that a hole 62 may be required through both the inner bed side wall and the inner pocket side wall 52 in order to provide access for bolt 28 from the clamping plate 24 to the vertical leg 14. It is found, however, that generally one of the two illustrated stake pocket configurations exist, i.e., where a lip 54 extends to the inner edge 56 of the stake pocket 38 thereby utilizing the pivoting action about that edge 56 as illustrated in FIG. 3; or where such a lip 54 does not occur, so that the inner pocket side wall 52 extends downward from the inner edge 66 of the stake pocket 64 so as to permit direct clamping of the vertical leg 14 against such inner stake pocket side 52, as shown in FIG. 4.

When tie-downs lines 68 are not used, or the tie-down anchor 10 is not desired, removal of the single bolt 28 will permit removal and storage of the tie-down anchor 10. Installation and removal of the tie-down anchor 10 thus is rapid and simple.

As noted above, protective pads 30 and 32 may be added to the bottom surface 34 of the horizontal leg 16 and the inner surface 36 of the clamping member 24, respectively, to protect the finish of the pickup bed 42.

It is thought that the stake pocket tie-down anchor of the present invention and its many attendant advantages will be understood rom the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A tie-down anchor, for use in combination with a stake pocket having an opening formed in the top of the side rail of a pickup truck bed or the like, said stake pocket having an inner pocket side wall on the inside of the bed, which inner pocket side wall has a hole formed therein, wherein the tie-down anchor comprises:
    a. an L-shaped member having a first leg and a second leg;
        the first leg, having a threaded hole formed therein, which extends vertically into the stake pocket so that it lies adjacent to said inner pocket side wall of said stake pocket; and
        the second leg which extends outwardly and horizontally beyond the stake pocket opening and atop the side rail;
    b. a tie-down connection member attached to the second and horizontal leg and extending upwardly so as to be available for a tie-down line;
    c. a clamping plate, having a hole formed therein; and
    d. a threaded bolt which sequentially penetrates the clamping plate and the inner pocket side wall of the stake pocket, and engages with the threaded hole of the first and vertical leg;
    e. so that upon tightening said bolt, the first and vertical leg is drawn toward the pocket side wall of the stake pocket, thereby rigidly securing the tie-down anchor within the stake pocket by forcing the second and horizontal leg tight against the top of the side rail, or by clamping the inner pocket side wall of the stake pocket between the first and vertical leg and the clamping plate.

2. The tie-down anchor, as recited in claim 1, wherein the tie-down connection is in the form of a hook.

3. A tie-down anchor, as recited in claim 1, wherein protective pads are adhesively joined to the second and horizontal leg of the L-shaped member and to the clamping plate, so as to protect the finish of the pickup bed.

* * * * *